United States Patent [19]

Rau

[11] 4,290,770
[45] Sep. 22, 1981

[54] PROCESS FOR THE COLORATION OF HYDROPHOBIC FIBERS

[75] Inventor: Manfred C. Rau, La Campagne, France

[73] Assignee: P C U K Produits Chimiques Ugine Kuhlmann, Tour Manhattan-Courbevoie, France

[21] Appl. No.: 108,757

[22] Filed: Dec. 31, 1979

[30] Foreign Application Priority Data

Jan. 19, 1979 [FR] France ................... 79 01329

[51] Int. Cl.³ .................................... C09B 55/00
[52] U.S. Cl. .................................................... 8/662
[58] Field of Search ................................ 8/662, 41

[56] References Cited

FOREIGN PATENT DOCUMENTS 47-31926  8/1972  Japan .

OTHER PUBLICATIONS

Bhaskare, C. K. and Mukhedar, A. J., Chemical Abstracts, 1978, 89, (No. 14), 112264h.

I. M. Bazavova et al., Zhurnal Organicheskoi Khimii, 1974, vol. 10, No. 2, pp. 308–311.
L. Legradi, Talanta, 1970, vol. 17, pp. 161–165.

*Primary Examiner*—A. Lionel Clingman
*Attorney, Agent, or Firm*—Beveridge, DeGrandi, Kline & Lunsford

[57] ABSTRACT

The invention relates to the coloration of artificial or synthetic materials. There is used as disperse dyestuff a compound of the general formula:

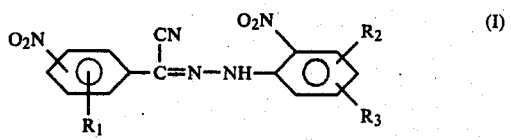

in which $R_1$ represents a hydrogen atom or a nitro group, $R_2$ represents a hydrogen or halogen atom or a nitro, trifluoromethyl, alkyl or alkoxy group and $R_3$ represents a hydrogen or halogen atom or a cyano group.

11 Claims, No Drawings

PROCESS FOR THE COLORATION OF HYDROPHOBIC FIBERS

The present invention relates to the coloration of artificial of synthetic materials.

It has been found that the compounds of the general formula:

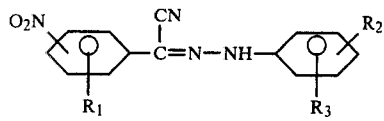
(I)

in which $R_1$ represents a hydrogen atom or a nitro group, $R_2$ represents a hydrogen or halogen atom or a nitro, trifluoromethyl, alkyl or alkoxy group and $R_3$ represents a hydrogen or halogen atom or a cyano group, are very suitable as disperse dyestuffs for the coloration of artificial or synthetic materials in yellow shades.

The halogen atom is preferably chlorine or bromine. The alkyl or alkoxy group which $R_2$ may represent preferably contains 1 to 4 carbon atoms and is especially a methyl, methoxy or ethoxy group.

The compounds of formula (I) in which $R_1$ represents a hydrogen atom are found to be particularly interesting.

Among the compounds of formula (I) there is known especially that of the formula:

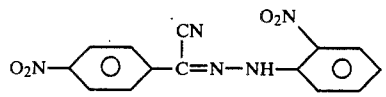
(II)

described in Bazavova, I. M. et al. in Zh. Org. Khim., 1974, 10(2), 308–311 (cf. Chemical Abstracts 80 No. 120455a), but its application as a disperse dyestuff has not been considered.

Generally, the compounds of formula (I) may be prepared in known way by coupling the diazo derivative of an o-nitraniline of the formula:

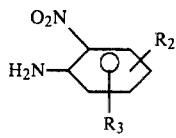
(III)

with a phenylacetonitrile of the formula:

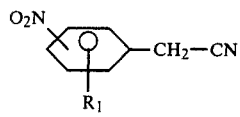
(IV)

in which formulae, $R_1$, $R_2$, $R_3$ have the same definitions as above.

The dyestuffs according to the invention are perfectly suitable for the dyeing and printing of all materials able to be dyed by disperse dyestuffs, especially those based on hydrophobic fibers such as polyurethane fibers, polyolefin fibers such as polypropylene modified or not by basic treatment or by nickel, chlorinated polyolefin fibers, diacetate or triacetate cellulose fibers and above all polyamide fibers such as Nylon-6, Nylon-6,6 and Nylon-12, aromatic polyesters such as those from terephthalic acid and ethylene glycol or 1,4-dimethylol cyclohexane or mixed polymers of terephthalic acid and isophthalic acid with ethylene glycol.

The application of the dyestuffs according to the invention may be effected by any known technique of dyeing by means of disperse dyestuffs.

Thus, for dyeing in aqueous baths, the dyestuffs of the invention, insoluble or very sparingly soluble in water, are advantageously used in finely divided form and the operation is effected in the presence of dispersants such as the waste lye from sulfite cellulose or of synthetic detergents and of a combination of various wetting agents and dispersants. In general it is advantageous to convert the dyestuffs to be used, before their application, into a tinctorial preparation containing the dispersant and the finely divided dyestuff in such a form that a fine dispersion is obtained by dilution of the preparation with water. Such tinctorial preparations may be obtained in known ways, for example by grinding the dyestuff in dry form or wetted with or without addition of dispersants during this grinding. After the wet grinding, there are obtained by subsequent drying tinctorial preparations containing textile auxiliary agents and the dyestuff.

As advantageous dispersants of the non-ionic type may be mentioned the products of addition of 8 moles of ethylene oxide with 1 mole of p-tertio-octylphenol, 15 to 16 moles of ethylene oxide with castor oil, 20 moles of ethylene oxide with the alcohol $C_{16}H_{33}OH$, the products of addition of ethylene oxide with di($\alpha$-phenylethyl)-phenols, polyethylene oxide-tertio-dodecyl-thioethers, the polyamines-polyglycolethers, and the products of addition of 15 or 30 moles of ethylene oxide with one mole of dodecylamine or stearylamine.

As anionic dispersants may be mentioned the sulfuric esters of fatty alcohols having 8 to 10 carbon atoms, the sulfuric esters of the products of addition of ethylene oxide with the corresponding fatty amides or alkyl phenols having 8 to 12 carbon atoms in the alkyl residue, the sulfonic esters containing alkyl residues having 8 to 20 carbon atoms, the products of sulfation of fatty acids and unsaturated oils, phosphoric esters containing alkyl residues having 8 to 20 carbon atoms, soaps of fatty acid, alkylarylsulfonates, the products of condensation of formaldehyde with naphthalenesulfonic acid as well as the sulfonates of lignin.

The appropriate cationic dispersants are the quaternary ammonium compounds which contain alkyl or aralkyl residues having 8 to 20 carbon atoms.

The tinctorial preparations may also contain, in addition to the dispersants, organic solvents especially those boiling above 100° C., which are advantageously miscible with water such as the mono- and di-alkylglycolethers, dioxan, dimethylformamide or dimethylacetamide, tetramethylene sulfone or dimethyl sulfoxide. It is advantageous to grind the dyestuff, the dispersant and the solvent together. Solvents alone may be used instead of the dispersant, but the tinctorial preparations must contain a dispersant or else a solvent.

The dyeing of polyester fibers with the dyestuffs of the invention is effected in aqueous dispersion according to the processes used for polyesters. Polyesters from aromatic polycarboxylic acid and polyalcohol are preferably dyed at temperatures above 100° C. and under pressure. The dyeing can also be carried out at the boiling point of the dyebath in the presence of vehicles such as, for example, polyphenols, compounds of diphenyl-polychlorobenzene, or analogous auxiliary products or also by the Thermosol process, that is by foularding with subsequent heat treatment, for example, heat-fixing at 180°–210° C. Cellulose diacetate fibers are advantageously dyed at temperatures of 80°–85° C., while cellulose triacetate fibers are dyed at the boiling point of the dyebath. For dyeing cellulose diacetate or polyamide fibers, it is not necessary to use vehicles.

For the heat-fixing of the dye, the foularded polyester fabric is heated, advantageously after previous drying, for example in a current of hot air at temperatures exceeding 100° C., advantageously between 180° and 210° C. The dyeings obtained may be subjected to a subsequent treatment, for example by heating in an aqueous solution of a non-ionic detergent.

Instead of impregnation, the dyes according to the invention may also be applied by printing. For this purpose, a printing color is used containing in addition the usual auxiliary agents, such as wetting and thickening agents, the dyestuff being finely dispersed.

The dyestuffs according to the invention may also be applied in a solvent medium, for example in perchlorethylene alone or in admixture with 5–10% of dimethylformamide or methanol.

With the dyestuffs of the invention, full-bodied dyeings and prints are obtained having good fastness, especially to heatfixing, sublimation, folding, flue gas, overdyeing, dry-cleaning, chlorine and to wetting, for example with water, to laundering and to perspiration.

The dyestuffs according to the invention may also be used for dyeing in bulk of polyamide, polyester and polyolefin yarns. The polymer to be dyed is preferably mixed in the form of powders, grains, shavings, ready-to-use spinning solutions or in a molten state, with the dyestuff which is incorporated in the dry state or in the form of a dispersion or solution in a solvent which may be volatile. After homogeneous distribution of the dyestuff in the solution or in the molten mass of the polymer, the mixture is treated in a known way by grinding, pressure or extrusion, in order to obtain fibers, yarn, single threads, films, etc. Intense and even colorations having good fastness to light and good general fastness are obtained with the dyestuffs according to the invention.

The dyestuffs of the invention are distinguished especially by their good general properties of application (affinity and fastness to light) on polyester fibers. On these fibers the said dyestuffs are much faster to light than the compound of the formula:

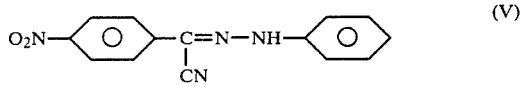

(V)

described in the journal Talanta 1970, 17(2) pages 161–5 (cf. for example Chemical Abstracts, vol. 72, 1970, No. 106721n) and shown as an acid-base indicator. It has been found that the good properties of fastness to light of the dyestuffs of formula (I) are related to the presence of the $NO_2$ group in the ortho position to the —NH— group.

The following examples in which the parts and percentages are by weight unless the contrary is mentioned, illustrate the invention without it being limited thereby.

EXAMPLE 1

(a) Preparation of the dyestuff 8.2 parts of 2-nitro-aniline are dissolved in 60 parts by volume of 94% sulfuric acid, and the solution is then cooled to 0° C. and diazotised at this temperature by means of a solution of 3.45 parts of sodium nitrite in 46 parts of 94% sulfuric acid. The solution of the diazo compound thus obtained is then poured at between 0° and 5° C. into a solution of 8.1 parts of p-nitrobenzyl cyanide in 200 parts by volume of acetone and 80 parts of water the acidity of the solution of diazo compound being neutralized by simultaneous addition of a 10 N aqueous solution of sodium hydroxide. The product obtained is then filtered off, washed and treated in 300 parts by volume of ethanol at the boil.

The dyestuff of formula (II) is thus obtained, a yellow product which melts at 213° C. IR spectrum (KBr): 3240 cm$^{-1}$ $\nu$(NH); 2220 cm$^{-1}$ $\nu$(CN).

(b) Application 4 parts of the above dyestuff, 2 parts of dispersant of the lignosulfonate type and a sufficient quantity of water and acetic acid to take the pH to 6–7 and the weight to 80 parts are ground.

By means of the dispersion thus obtained which contains 5% of dyestuff, two dyebaths are prepared having the following compositions:

| | |
|---|---|
| 5% Dispersion | 0.9 or 3 parts |
| Water | 100 parts |
| 10% Acetic acid | 0.5 part |
| 10% Ethoxylated castor oil (Sunaptol LT) | 1 part |

5 parts of ethyleneglycol polyterephthalate fibers are introduced into each bath, then they are heated in an autoclave to 120° or 130° C. and maintained at this temperature for an hour. After dyeing, the fibers are treated for 5 minutes at 80°–85° C. in an aqueous solution of sodium hydrosulfite.

The fibers are dyed in deep yellow shades of excellent fastness, especially to light.

EXAMPLE 2

(a) Preparation of the dyestuff 10 parts of 2-nitro-4-methyl-aniline are dissolved in 100 parts by volume of 30% hydrochloric acid. The solution is then cooled to 0° C., added with 100 parts of crushed ice, diazotized by means of 40 parts by volume of an aqueous solution of sodium nitrite at 500 g/l and kept under stirring for about 30 minutes. The solution of diazo compound thus obtained is then poured within about one hour into a solution of 11 parts of p-nitrobenzyl cyanide in 400 parts by volume of acetone, previously added with 200 parts by volume of crushed ice. During the introduction of the diazo solution, the pH is maintained at 2–3 by simultaneous addition of a 10 N aqueous solution of sodium hydroxide. The precipitate formed is then filtered off and washed with water, then it is treated in 200 parts by volume of ethanol at the boil.

The dyestuff of the formula:

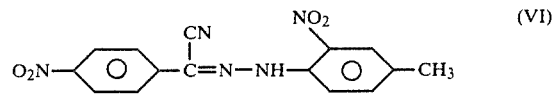

(VI)

is thus obtained. It melts at 247° C.

IR Spectrum (KBr): 3250 cm$^{-1}$ $\nu$(NH); 2220 cm$^{-1}$ $\nu$(CN);

Weight analysis:

|  | C % | H % | N % |
|---|---|---|---|
| Calculated for $C_{15}H_{11}N_5O_4$ | 55.38 | 3.38 | 21.53 |
| Found | 55.37 | 3.38 | 21.39 |

(b) Application

When applied as in Example 1(b), this dyestuff dyes polyester fibers in yellow shades of excellent fastness, especially to light.

EXAMPLE 3

The operation is conducted as in Example 2(a) using 10 parts of 2-nitro-4-chloro-aniline and 9.7 parts of p-nitrobenzyl cyanide. The diazotization is carried out with only 35 parts by volume of the sodium nitrite solution. After filtering off and washing, the precipitate is treated with 250 parts by volume of ethanol at the boil.

The dyestuff of the formula:

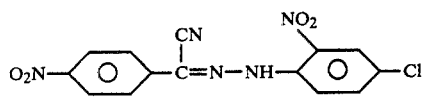

is thus obtained. It melts at 217° C.

IR spectrum (KBr): 3230 cm$^{-1}$ $\nu$(NH); 2200 cm$^{-1}$ $\nu$(CN).

Weight analysis:

|  | C % | H % | N % |
|---|---|---|---|
| Calculated for $C_{14}H_8N_5O_4Cl$ | 48.62 | 2.32 | 20.26 |
| Found | 49.11 | 2.57 | 19.88 |

When applied as in Example 1(b), this dyestuff dyes polyester fibers in yellow shades of excellent fastness, especially to light.

EXAMPLE 4

The operation is as in Example 2(a) using 10 parts of 2-nitro-4-methoxy-aniline and 10 parts of p-nitrobenzyl cyanide. The diazotization is carried out with only 35 parts by volume of sodium nitrite solution. After filtering off and washing, the precipitate is treated with 350 parts by volume of ethanol at the boil.

The dyestuff of the formula:

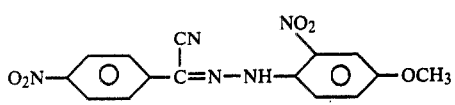

is thus obtained. It melts at 253° C.

IR spectrum (KBr): 3240 cm$^{-1}$ $\nu$(NH); 2210 cm$^{-1}$ $\nu$(CN).

Weight analysis:

|  | C % | H % | N % |
|---|---|---|---|
| Calculated for $C_{15}H_{11}N_5O_5$ | 52.79 | 3.22 | 20.53 |
| Found | 53.19 | 3.25 | 20.39 |

When applied as in Example 1(b), this dyestuff dyes polyester fibers in orange-yellow shades of excellent fastnesses.

What is claimed is:

1. Process for the coloration of hydrophobic fibers in which the disperse dyestuff used is a compound of the formula:

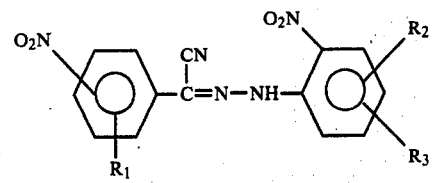

in which $R_1$ represents hydrogen or nitro, $R_2$ represents hydrogen, halogen, nitro, trifluoromethyl, alkyl or alkoxy, and $R_3$ represents hydrogen, halogen or cyano.

2. The process according to claim 1 in which $R_1$ represents hydrogen.

3. The process according to claim 2 in which the halogen is chlorine or bromine.

4. The process according to claim 1 in which the halogen is chlorine or bromine.

5. The process according to claim 1, 2, 3 or 4 in which the alkyl or alkoxy group contains 1 to 4 carbon atoms.

6. The process according to claim 1 in which the compound used has the following formula:

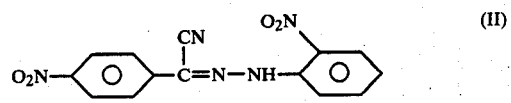

7. The process according to claim 1 in which the compound used has the following formula:

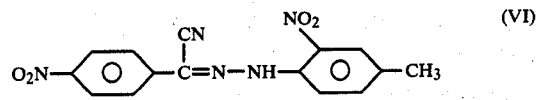

8. The process according to claim 1 in which the compound used has the following formula:

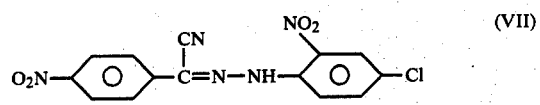

9. The process according to claim 1 in which the compound used has the following formula:

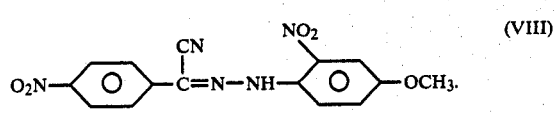

10. Hydrophobic fibers colored by the process according to claim 5.

11. Hydrophobic fibers colored by the process according to claims 1, 2, 3, 4, 6, 7, 8 or 9.

* * * * *